Dec. 9, 1930.     A. F. GILLET     1,784,667
SPLIT SEGMENTAL WASHER
Filed Aug. 2, 1929
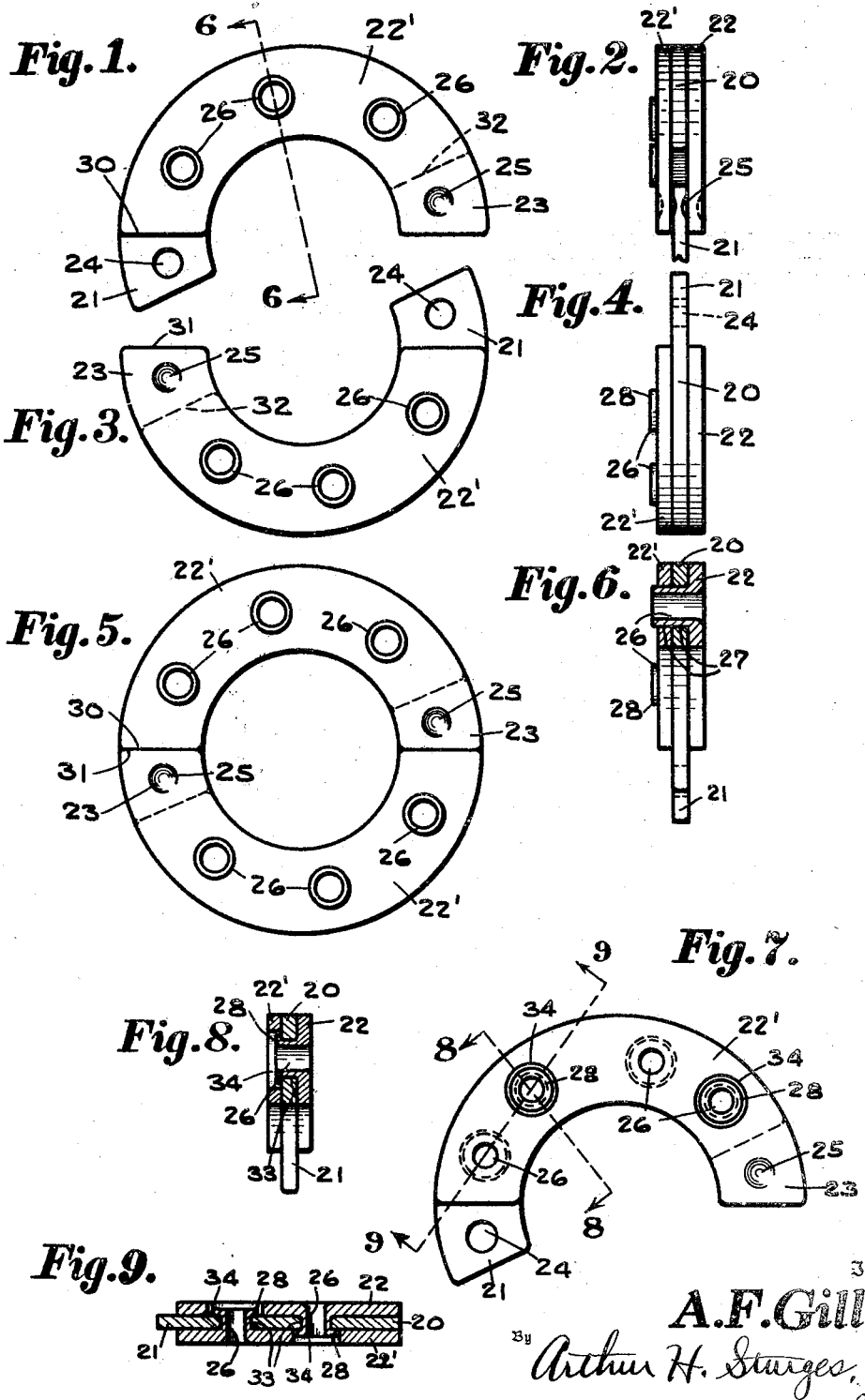

Patented Dec. 9, 1930

1,784,667

UNITED STATES PATENT OFFICE

ALEXIS F. GILLET, OF OMAHA, NEBRASKA, ASSIGNOR TO JUBILEE MANUFACTURING COMPANY, OF OMAHA, NEBRASKA, A CORPORATION OF NEBRASKA

SPLIT SEGMENTAL WASHER

Application filed August 2, 1929. Serial No. 383,135.

The present invention relates to improvements in split segmental washers and methods for producing the same, and has for an object to provide an improved segmental washer, the parts or sections whereof are adapted to member together in an improved manner whereby the same are readily attached and detached.

Another object of the invention is to provide an improved split segmental washer whereby the same may be so positioned upon a shaft that it will function as a shim to enable the pinions and gearing to member together in an improved manner whereby the teeth of the pinion will interfit and mesh without friction.

A further object and advantage of the invention is that by forming apertures through the plates the said apertures will serve to retain the oil when the device is in use upon machinery, such as a line shaft. In other words, the apertures of the device will contain oil or grease.

A further object of the invention is to provide an improved shim which is applicable to the shaft of the gearing whereby said parts may be shimmed together for substantially perfect register with adjacent gearing.

A still further object of the invention is to provide an improved split segmental washer or shim which is of simple and inexpensive construction and in which the sections or parts of the shim may be fitted together in opposite directions upon a shaft and snapped or clipped together whereby the same may with facility be applied and with facility removed.

A still further object of the invention is to provide an improved method and steps of the method for the making and assembling the various parts of the shim whereby such parts will be co-ordinated to provide a tongue at one end and a recess at the other end for receiving the tongue of the adjacent shim section, and whereby further the parts of the shim or washer may be united in a novel and simple manner.

A still further object of the invention is to provide an improved method for making washers or shim by the use of a punch-press in which a tang is punched from one of the plates forming a tang through the remaining plate to unite the same together in grouped relation and whereby the tang may be clinched or upset to avoid any likelihood of the separation of the parts.

With the foregoing and other objects in view, the invention will be more fully described hereinafter and more particularly pointed out in the appended claims.

In the drawings, in which like parts are denoted by like reference characters throughout the several views.

Figure 1 is a side view of a half portion or section of the improved washer or shim.

Figure 2 is an edge view of the same, with a portion broken away.

Figure 3 is a side view of the companion washer section adapted to interfit with the section shown in Figure 1.

Figure 4 is an edge view of the section shown in Figure 3 and taken from the right side of Figure 3.

Figure 5 is a side view showing the completed shim or washer with the two sections shown in Figures 1 and 3 united.

Figure 6 is a cross section taken on the line 6—6 in Figure 1.

Figure 7 is a side view showing a slight modification.

Figure 8 is a cross sectional view taken along the line 8—8 in Figure 7 and

Figure 9 is a similar view taken along the line 9—9 also in Figure 7.

Referring more particularly to the drawings, it will be understood that the two half or segmental sections of the improved washer are substantially identical and therefore but one will be described. Each section consists of an intermediate plate 20 and two side plates 22 and 22'. These plates are relatively offset, or rather the intermediate plate is offset longitudinally or circumferentially from the two side plates 22 and 22' whereby one end 21 of the intermediate plate 20 projects beyond the adjacent end of the side plates 22 and 22' and thus forms a projecting tongue, which is perforated as indicated at 24. The adjacent end 30 of the two side plates 22 and 22' form shoulders to take against the end 31 of the companion segmental section. These ends 31 are shown in Figure 3 and in Figure 5 as butting against the end 30. In Figure 1 the dotted line 32 shows the termination of the opposite end of the intermediate plate 20. The side plates 22 and 22′ project beyond this terminal end 32 and they enclose a recess which is adapted to receive the tongue 21 as shown in Figure 3 of the companion section. Thus each section is provided with a perforated tongue 21 at one end and with a recess comprised between the walls 23 at the opposite end. The tongue 21 of one section will come opposite the recess upon the other section so that the tongues and recesses of the two sections will interfit. Bosses 25 are punched from the walls 23 into the recesses as indicated in Figure 2 and these punched in bosses are adapted to register with the perforations 24 of the tongues 21. It will be understood that the washer plates are preferably made from metal or some other material possessing inherent resiliency so that the bosses may snap or clip into these recesses 24 in the act of inserting the tongue 21 between the walls 23 of the recesses. This will form a convenient means for attaching the two sections of the washer and for detaching the same. It only becomes necessary to exert a slight force in moving the tongue into and out of the recesses. Once in the recesses, however, the tongues will be firmly gripped in place and the washer or shim will remain placed until forcibly removed.

As shown in Figure 6, the side and intermediate plate may be joined together by punching a tang 26 from one of the side plates 22 through the intermediate plate 20 and the associated side plate 22′. For this purpose it is convenient to initially form registering perforations 27 in the intermediate plate 20 and the side plate 22′. In Figure 6 the tang 26 is shown as projecting beyond the side plate 22′ to form a burr which assists in holding the plates together. If desired this burr may be removed. The tang 26 may be formed by means of the downward movement of a punch-press. The punch press will preferably operate upon the blank wall of the side plate 22, which blank wall furnishes the material out of which the tang 26 is formed in the operation of punching. It will be understood that this method of punching is more economical than the old way of attaching the plates by the use of rivets. As before stated, the burr formed may be ground off or otherwise removed.

This punching operation may be performed at several places along the plates. In Figure 1 three such tangs are shown. All these tangs are punched from the one side plate 22. In case it is not desirable to have the operation attended by the formation of a burr, the construction shown in Figures 7, 8 and 9 may be resorted to. In these figures the three plates are assembled in substantially the same manner and the operation of punch-pressing is also performed in order to secure the parts together, but the modification consists in performing the operation from opposite sides of the segmental section.

As shown in Figure 8 a burr 26 is punched from the side plate 22 through a narrow perforation 33 in the intermediate plate 20 and into a wider perforation 34 in the companion side plate 22′. The burr, shown at 28 is offset upon the face of the intermediate plate 20 and this burr lies wholly within the plane of the opposite side plate 22′.

As shown in Figure 9, two adjacent tangs appear in relatively opposite directions, one tang 26 from the plate 22 and the adjacent tang from the opposite side plate 22′. The tangs simply pass through the smaller openings in the intermediate plate 20 and are offset within the larger opening of the opposite side plate.

By this means two of the plates are joined by each of the burrs and the co-operating burrs and tangs act to join the three plates together into a unitary structure. In this manner the side surfaces of the device are left smooth and therefore any grinding operation is dispensed with.

In the use of the device, the washer sections thus formed are simply brought together in opposite directions upon the shaft and the tongues 21 are forced between the walls 23 of the recesses, the rounded internal portions of the bosses 25 snapping into the recesses or perforations 24 in the tongue 21 and thus holding the two or more sections of the washer in place as shown in Figure 5 and about the shaft. In removing the washer, one or more of the sections is gripped and forced in an opposite direction from the companion section whereby to withdraw the tongue from the recess and from the binding action of the bosses 25.

It will be appreciated that the improved steps of the method for assembling and uniting the plates together will bind the same into a strong unit by a simple and economical process without the use of rivets. It will be further appreciated that in view of the fact that no rivets are employed to hold the tongue 21 in the recess, that a difficult operation is dispensed with and the difficulty of removing the shim is also avoided.

The tangs and bosses may be formed, if desired, opposite to the showing in Figure 1 of the drawing, namely, apertures may be formed in the grooved portion of the device and a boss formed upon the tongue portion thereof.

Referring to Figures 7, 8 and 9. The parts marked on the drawing 22 and 22′ are identical and are formed with the same blanking dies, and the same stroke of the die perforates the apertures for later receiving a boss on the tongue portion. By later is meant when the device is assembled in use on a line shaft.

The medial plate 20 is formed separately with a separate and different blanking die.

The steps of the method in forming the device are as follows:

In assembling the pieces, the piece marked 22 is placed over a piece marked 20 in the drawing. Or, of course, plate 22′ may be placed over the piece 20. The said parts are now attached together by means of forming a burr 28 on the tang 26.

It will be understood that the tang 26 is formed during the blanking process. Namely, a die comes down and cuts the piece out and at the same time forms the tang. The burr to hold the parts together is formed during the assembling thereof.

Next the piece marked in the drawings 21 is placed over the two pieces just now described as assembled and the burr is formed through the apertures in a manner whereby the burrs are all inside of the interior surface of the device.

I desire it to be understood that various changes and modifications may be made in the size, form and proportions of the various parts and the steps and processes of the method may be varied widely, provided all such modifications in the construction and the method fall within the scope of the following claims.

I claim:

1. A split segmental washer composed of sections comprising side and intermediate plates having means to attach companion sections together, and tangs punched in opposite directions from the side plates through the intermediate plate and upset upon the intermediate plate.

2. A split segmental washer composed of sections comprising side and intermediate plates, said side plates having staggered perforations, said intermediate plate having smaller perforations registering with the first named perforations, and tangs punched in opposite directions from the side plates through the registering perforation and upset against the intermediate plate within the perforations of the side plates.

In testimony whereof, I have affixed my signature.

ALEXIS F. GILLET.